US012587372B2

(12) United States Patent
Wang et al.

(10) Patent No.: US 12,587,372 B2
(45) Date of Patent: Mar. 24, 2026

(54) SINGLE REQUEST ARCHITECTURE FOR INCREASING EFFICIENCY OF SECURE MULTI-PARTY COMPUTATIONS

(71) Applicant: GOOGLE LLC, Mountain View, CA (US)

(72) Inventors: Gang Wang, Frederick, MD (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 41 days.

(21) Appl. No.: 18/851,393

(22) PCT Filed: Jun. 22, 2023

(86) PCT No.: PCT/US2023/025928
§ 371 (c)(1),
(2) Date: Sep. 26, 2024

(87) PCT Pub. No.: WO2024/030200
PCT Pub. Date: Feb. 8, 2024

(65) Prior Publication Data
US 2025/0219813 A1 Jul. 3, 2025

(30) Foreign Application Priority Data
Jul. 31, 2022 (IL) .......................................... 295204

(51) Int. Cl.
*H04L 9/08* (2006.01)

(52) U.S. Cl.
CPC .......... *H04L 9/085* (2013.01); *H04L 2209/46* (2013.01)

(58) Field of Classification Search
CPC ....................................................... H04L 9/085
(Continued)

(56) References Cited

U.S. PATENT DOCUMENTS 8,504,917 B2 8/2013 Clarke-Martin et al.
10,699,312 B2 6/2020 Stroud et al.
(Continued)

FOREIGN PATENT DOCUMENTS

WO WO 2022125182 6/2022
WO WO 2022150428 7/2022

OTHER PUBLICATIONS

Dunaway [online], “How the Wrapper Won the Header: AConversation With Index Exchange,” Dec. 7, 2016, retrieved on Feb. 13, 2024, retrieved from URL <https://www.admonsters.com/how-wrapper-won-header-conversation-index-exchange/>, 11 pages.
(Continued)

*Primary Examiner* — Teshome Hailu
(74) *Attorney, Agent, or Firm* — Fish & Richardson P.C.

(57) ABSTRACT

Methods, systems, and apparatus, including computer programs encoded on a computer storage medium, for using cryptographic techniques to enhance data security and privacy and increasing computational efficiency in selecting digital components for multiple digital component slots are described. In one aspect, a method includes receiving, from a client device and by a first MPC computer of a group of MPC computers that collaborate to perform MPC computations, a composite request for digital components to display in multiple digital component slots of an electronic resource. The composite request includes first secret shares of data identifying user groups that include a user of the client device as a member. A determination is made, in collaboration with one or more second MPC computers, a first secret share of a value of each of multiple candidate parameters of a candidate expression for each digital component in a set of digital components.

20 Claims, 6 Drawing Sheets

(58) Field of Classification Search
USPC .......................................................... 380/278
See application file for complete search history.

(56) References Cited

U.S. PATENT DOCUMENTS

| | | | | |
|---|---|---|---|---|
| 2015/0213509 | A1 | 7/2015 | Musumeci | |
| 2020/0153640 | A1* | 5/2020 | Ranellucci | H04L 9/3255 |
| 2020/0358607 | A1* | 11/2020 | Wang | H04L 9/0869 |
| 2021/0311619 | A1* | 10/2021 | Winnemoeller | G06T 11/60 |
| 2022/0045867 | A1* | 2/2022 | Beery | H04L 9/0861 |

OTHER PUBLICATIONS

Github.com [online], “Dovekey,” Sep. 2020, retrieved on Feb. 27, 2024, retrieved from URL <https://github.com/google/ads-privacy/tree/master/proposals/dovekey>, 7 pages.

Github.com [online], “Dovekey_auction.md,” Jan. 2021, retrieved on Feb. 27, 2024, retrieved from URL <https://github.com/google/ads-privacy/commits/master/proposals/dovekey/dovekey_auction.md>, 9 pages.

Grover [online], “What is Single Request Architecture?” Oct. 28, 2019, retrieved on Feb. 13, 2024, retrieved from URL<https://www.adpushup.com/blog/what-is-single-request-architecture/>, 10 pages.

International Search Report and Written Opinion in International Appln. No. PCT/US2023/025928, mailed on Oct. 11, 2023, 12 pages.

International Preliminary Report on Patentability in International Appln. No. PCT/US2023/025928, mailed on Feb. 13, 2025, 7 pages.

LaRue [online], “What Is Single-Request Architecture?” Apr. 27, 2017, retrieved on Feb. 13, 2024, retrieved from URL <https://www.admonsters.com/ad-ops-decoder-what-single-request-architec-
ture/>, 8 pages.

Office Action in Israeli Appln. No. 295204, mailed on Sep. 30, 2024, 4 pages.

* cited by examiner

400

MPC1

MPC2

Identify eligible digital
components *402*

Identify eligible digital
components *404*

Determine selection values *406*

407

Determine whether the digital component is
a candidate *408*

Order the digital components
by selection value *410*

Order the digital components
by selection value *412*

Determine secret shares of an accumulated
value for each candidate digital component
based on the order *414*

Determine, for each candidate digital
component, secret shares of a result that
indicates whether the accumulated value
equals a specified value *416*

Determine secret shares of a winner
parameter for each digital component *418*

Determine a selection result *420*

Update candidate parameters *422*

Provide shares of selection results *424*

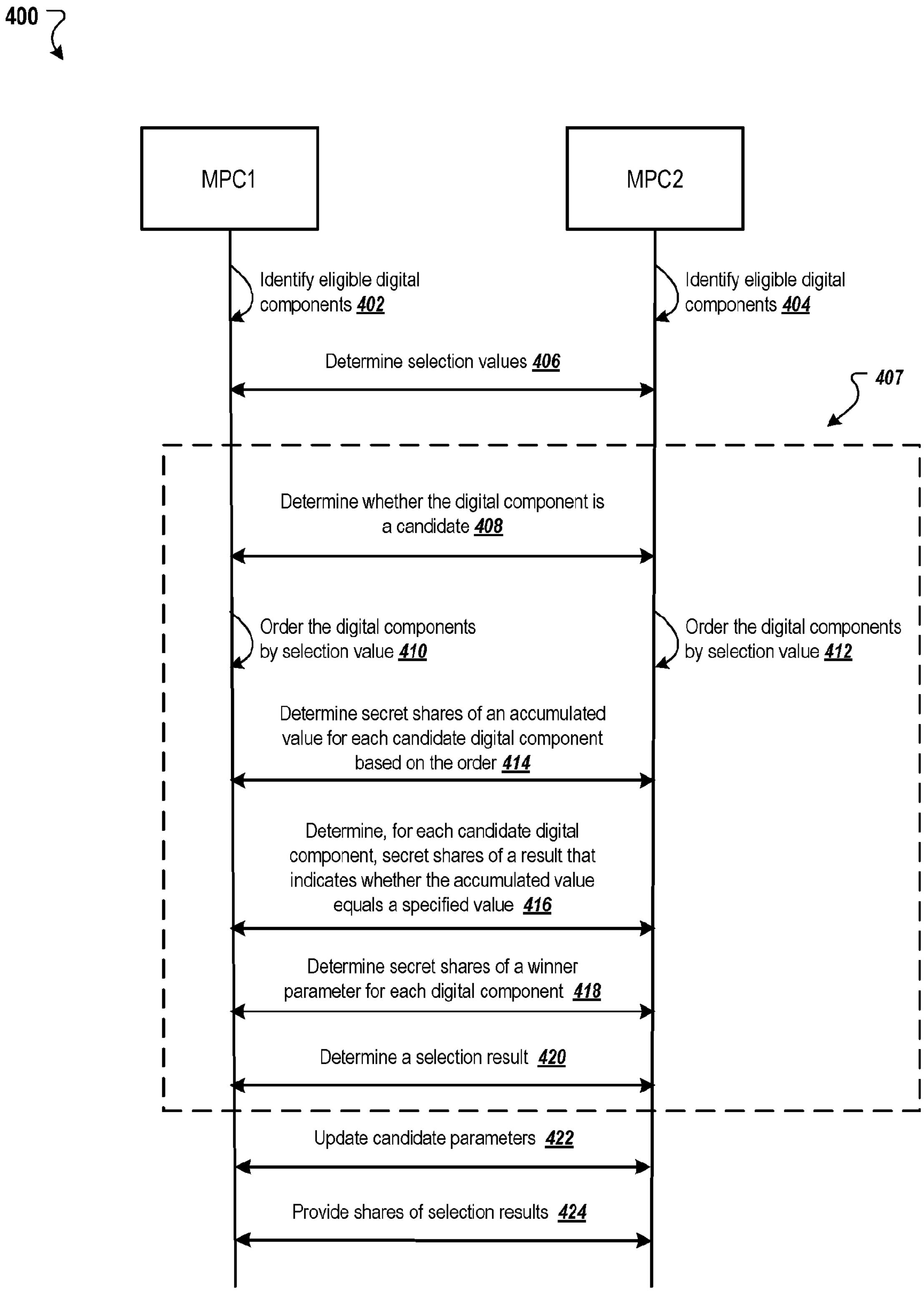

510    Receive a composite request for digital components

520    Determine a secret share of a value of each of a multiple candidate parameters 530    Generate a selection result for a digital component slot 540    More slots?

Yes          No

550    Update the value of one or more of the candidate parameters

560    Send selection result generated for each digital component slot

SINGLE REQUEST ARCHITECTURE FOR INCREASING EFFICIENCY OF SECURE MULTI-PARTY COMPUTATIONS

CROSS-REFERENCE TO RELATED APPLICATIONS

This application is a National Stage Application under 35 U.S.C. § 371 and claims the benefit of International Application No. PCT/US2023/025928, filed Jun. 22, 2023, which claims the benefit of priority to Israeli Application Serial No. 295204, filed Jul. 31, 2022. The foregoing applications are incorporated herein by reference in their entireties and for all purposes.

TECHNICAL FIELD

This specification relates to cryptography, data processing, data security, and privacy.

BACKGROUND

Secure MPC is a family of cryptographic protocols that prevents access to data by distributing computations across multiple parties such that no individual party can access another party's data or intermediate computed values, while outputs are released only to designated parties. The MPC computers typically perform the computations using secret shares or other encrypted forms of the data and secure exchange of information between the parties.

SUMMARY

In general, one innovative aspect of the subject matter described in this specification can be embodied in methods that include the actions of receiving, from a client device and by a first multi-party computation (MPC) computer of a group of MPC computers that collaborate to perform MPC computations, a composite request for digital components to display in multiple digital component slots of an electronic resource, the composite request including first secret shares of data identifying user groups that include a user of the client device as a member: determining, in collaboration with one or more second MPC computers of the group of MPC computers, a first secret share of a value of each of multiple candidate parameters of a candidate expression for each digital component in a set of digital components, for each digital component slot, generating a selection result comprising a first secret share of digital component data identifying a selected digital component that is selected for display in the digital component slot, the generating including, for each digital component in the set of digital components, determining, in collaboration with the one or more second MPC computers, a first secret share of a candidate result for each digital component based on the candidate expression for the digital component and the value of each of the plurality of candidate parameters, and generating, based on the first secret share of the candidate result for each digital component and a corresponding second secret share of the candidate result held by each of the one or more second MPC computers, the selection result, and for at least a portion of the digital component slots, updating, for at least a portion of the digital components, the value of one or more of the candidate parameters for the digital component based on the selected digital component; and sending, to the client device, composite result data including the selection result generated for each digital component slot. Other embodiments of this aspect include corresponding systems, apparatus, and computer programs, configured to perform the actions of the methods, encoded on computer storage devices.

These and other implementations can each optionally include one or more of the following features. Some aspects include obtaining a first secret share of the candidate expression for a given digital component. The candidate expression for the given digital component includes candidate parameters for determining whether the digital component is a candidate for distribution in response to digital component requests.

Some aspects include generating a garbled circuit for at least a subset of the set of digital components based on the candidate expression for each digital component in the subset.

In some aspects, generating the selection result for each digital component slot includes generating each selection result in a sequence from a first digital component slot to a last digital component slot of the multiple digital component slots. Updating, for at least a portion of the digital components, the value of one or more of the candidate parameters for the digital component can include updating the value of the one or more candidate parameters for the digital component based on the selection result of at least one previous digital component slot prior to generating the selection result for a subsequent digital component slot in the sequence.

In some aspects, adjusting, for at least a portion of the digital components, the value of one or more of the candidate parameters for the digital component includes updating secret shares of a pacing parameter for the selected digital component.

In some aspects, updating, for at least a portion of the digital components, the value of one or more of the candidate parameters for the digital component includes updating, for a given digital component, secret shares of a value of an exclusion parameter that excludes the given digital component from being presented with the selected digital component.

In some aspects, updating, for at least a portion of the digital components, the value of one or more of the candidate parameters for the digital component includes updating, for a given digital component, secret shares of a value of an inclusion parameter that specifies that the given digital component is eligible to be presented with the selected digital component.

Some aspects includes storing secret shares of user group membership parameters for a subset of the set of digital components after generating the selection result for a first digital component slot. The user group membership parameter for a digital component indicates whether a user of the client device is a member of a user group corresponding to the digital component. Some aspects include using the stored secret shares of the user group membership parameters for the subset of digital components for selecting a digital component for one or more subsequent digital component slots following the first digital component slot.

In some aspects, generating the selection result includes generating a first secret share of a candidate digital component having a highest selection value among candidate digital components. A candidate digital component is a digital component having a candidate result indicating that the digital component is a candidate for selection.

In some aspects, the composite request includes a set of contextual signals. Some aspects include selecting the set of digital components based on the set of contextual signals.

Particular embodiments of the subject matter described in this specification can be implemented so as to realize one or more of the following advantages. Using a secure MPC process performed by two or more MPC server computers (also referred to as MPC computers for brevity) operated by different parties to select digital components based on shares of user information ensures that the user information cannot be accessed in cleartext by either MPC computer or another party absent unauthorized collusion between the MPC computers. In this way, as long as at least one MPC computer is honest, user data privacy and data security is preserved.

In a digital component selection process, the MPC computers can select from candidate digital components that satisfy one or more candidate conditions while preventing the parties from accessing user information in cleartext. The candidate conditions can include the eligibility of each digital component based on guidelines for the inclusion or exclusion of the digital component and guidelines on the manner or frequency of distribution of a digital component, among other factors. The conditions can include, for example, user group membership, frequency control, muting (e.g., user blocking), k-anonymity for preventing micro-targeting of users, and/or pacing and budget constraints.

As the selection of digital components is an online process that typically occurs at the time that content is being loaded at a client device, it is important that this process be completed quickly, e.g., within milliseconds. The techniques described in this document enhance the speed at which digital components are selected by reducing the size of data transmitted between the client device and the MPC cluster, by generating and sending a composite request for digital components and reducing the computational resources required by the MPC cluster, and by reducing the number of roundtrip communications/computations performed by the computers of the MPC cluster and the size of data transmitted between the computers. The reduction in data size between the client device and computers also reduces network bandwidth consumption and battery consumption of the client device, e.g., if the client device is a mobile device running on battery power.

A client device of a user can generate a probabilistic data structure, e.g., a cuckoo filter or a Bloom filter that represents user groups that include the user as a member and can provide the probabilistic data structure, or data that represents the probabilistic data structure, to the computers of the MPC cluster. Using probabilistic data structures in this way protects user privacy and maintains data security by preventing access to the user's group membership information, and reduces the size of the information provided to the MPC cluster as probabilistic data structures are compact representations of sets of data. The data representing the probabilistic data structure can be generated and sent to the MPC computers such that no party that receives only a portion of the data can access the user group membership of a user without either having the other portions or collaborating with the other MPC computers, e.g., using a secure MPC process. The reduction in data size reduces the amount of bandwidth consumed to transmit the information, reduces the latency in transmitting the information, and reduces the amount of processing power and associated battery power for devices running on batteries (e.g., mobile devices) required to transmit the information.

The MPC cluster can transmit secret shares of a result that identifies a selected digital component that the MPC cluster selected using the secure MPC process. By sending secret shares of a result for only selected digital components rather than information for all or a large set of digital components similarly reduces latency and consumed bandwidth, processing power, and battery power in transmitting and receiving the result. This also reduces the potential leakage of confidential information of content platforms that submit selection values for digital components to the MPC cluster by limiting the number of digital components for which information is provided to the client device.

Reducing the latency in content presentation also reduces the number of errors that occur at user devices while waiting for such content to arrive. As the content often needs to be provided in milliseconds and to mobile devices connected by wireless networks, reducing the latency in selecting and providing the content is critical in preventing errors (e.g., errors that occur when content fails to load) and reducing user frustration.

The techniques described in this document can further reduce latency, battery consumption of client devices, and computational requirements (e.g., CPU cycles) of MPC computers by selecting and providing multiple digital components for display at a client device in response to a single request rather than performing the same process for each separate request for each digital component slot of an electronic resource. The MPC computers can leverage the results of computations used to assess the eligibility and/candidacy of digital components for each digital component slot for the computations for subsequent digital components indicated in the request such that the number of computations and roundtrip communications between the MPC computers are reduced, thereby reducing latency and computation requirements. This also provides additional flexibility in generating candidate conditions for digital components, e.g., so that digital component providers can ensure that their digital components are either shown with particular digital components and/or prevented from being shown with particular digital components.

The described techniques also reduce latency and memory bandwidth consumption by obtaining data for digital components once for multiple digital component slots rather than re-obtaining data separately for each digital component slot. As such memory accesses can be a bottleneck in the digital component selection process, this can substantially reduce latency in the process.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a swim lane diagram of an example process for selecting a digital component for each digital component slot of a resource.

Like reference numbers and designations in the various drawings indicate like elements.

DETAILED DESCRIPTION

In general, this document describes systems and techniques for protecting the security of information in content selection and distribution using cryptographic protocols. A group of MPC computers, which can be referred to as an MPC cluster, can collaborate to perform a secure MPC process to select digital components based on user information without either MPC computer or any other party outside of the client device that stores the user information being able to access the user information in cleartext absent unauthorized collusion between the MPC computers.

A group of MPC computers can collaborate to execute a secure MPC protocol to select multiple digital components in response to a digital component request received from a client device. For example, many electronic resources, e.g., web pages, native application pages, etc., have multiple areas (e.g., digital component slots) to display dynamic content, such as digital components. Rather than select a digital component separately for each digital component slot, the MPC computers can leverage the results of computations for each digital component slot for each subsequent digital component slot to reduce the number of computations and roundtrip communications between the MPC computers. For example, the MPC computers can select a digital component for each digital component slot sequentially and leverage results of previous computations in the sequence for each subsequent digital component slot for which a digital component is selected.

Figure 1:
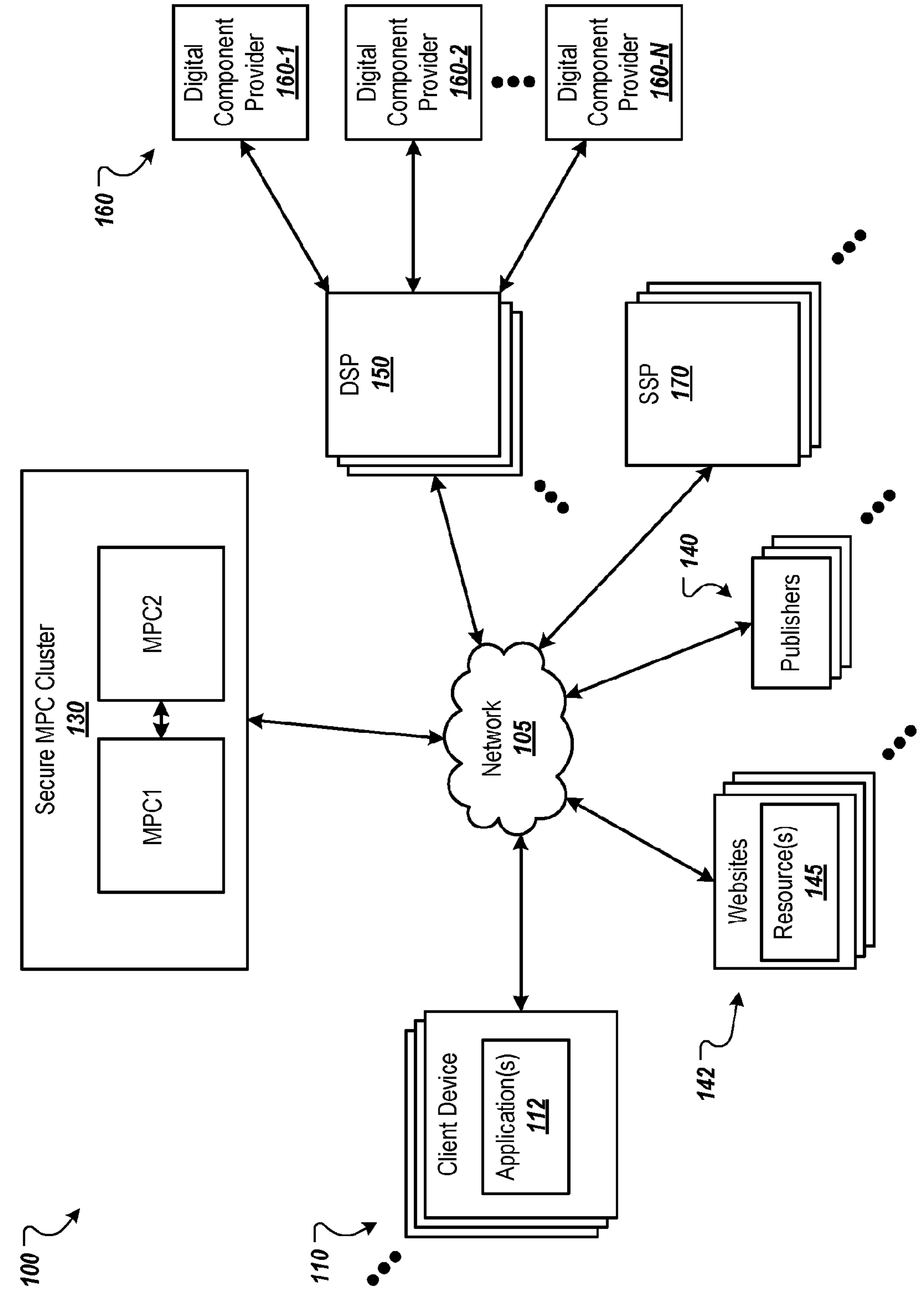
FIG. 1 is a block diagram of an environment in which an MPC cluster performs secure MPC processes to select digital components for distribution to client devices.

FIG. 1 is a block diagram of an environment 100 in which an MPC cluster 130 performs secure MPC processes to select digital components for distribution to client devices 110. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, and content platforms, e.g., supply-side platforms (SSPs) 170 and demand-side platforms (DSPs) 150. The example environment 100 may include many different client devices 110, secure MPC clusters 130, publishers 140, websites 142, DSPs 150, and SSPs 170.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming console, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher 140.

Some resources, application pages, or other application content can include one or more digital component slots for presenting, e.g., displaying, digital components with the resources 145 or application pages. A digital component slot is an area of an electronic resource (e.g., web page or application page) for displaying a digital component. A digital component slot can also refer to a portion of an audio and/or video stream (which is another example of an electronic resource) for playing a digital component. An electronic resource is also referred to herein as a resource for brevity. For the purposes of this document, a resource can refer to a web page, application page, application content presented by a native application, electronic document, audio stream, video stream, or other appropriate type of electronic resource with which a digital component can be presented.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes multiple digital component slots, the application 112 can generate a request for digital components for each of the multiple digital component slots. For example, the application 112 can generate and send a single request that requests a digital component for each of the multiple digital component slots of the resource. In some implementations, the digital component slot and/or the resource can include code (e.g., scripts) that cause the application 112 to request digital components from the MPC cluster 130, which selects digital components and provides the digital components (or data that references the digital components) to the application 112 for presentation to a user of the client device 110.

A request for digital components, which can also be referred to as a digital component request, can include different types of data for use in selecting a digital component for distribution to the client device 110. As described below, the different types of data can be included in sub-requests of a digital component request.

In some implementations, the request for digital components can include data that represents a context in which selected digital components will be presented at the client device. This contextual data can include data about the electronic resource with which the digital component will be presented. This data can include name or reference to a network location (e.g., domain) from which the electronic resource is requested. For example, the reference can include a Universal Resource Locator (URL) or Universal Resource Identifier (URI) for the electronic resource. The contextual data can indicate the type of the client device 110, e.g., smart phone, tablet, laptop, etc.

The contextual data can include data about the digital component slot(s) of the electronic resource. For example, the contextual data can include the number of digital component slots, the locations within the electronic resource of the digital component slots, the types of digital components (e.g., image, text, video, etc.) that can be presented in each digital component slot, and/or other appropriate data about the digital component slots.

The contextual data can include coarse geographic data that indicates a current location of the client device 110 when the digital component request is sent. For example, the contextual data can include the city, state, or region of the client device 110. The contextual data can also include the time of day, time zone, day of the week, and or other appropriate time information.

The contextual data can include the spoken language setting for the application 112 and/or client device 110 that sends the digital component request. For example, the contextual data can include the language in which the application 112 or client device 110 displays text.

Some publishers 140 use an SSP 170 to manage the process of obtaining digital components for digital component slots of its resources. An SSP 170 is a technology platform implemented in hardware and/or software that automates the process of obtaining digital components for the resources. Each publisher 140 can have a corresponding SSP 170 or multiple SSPs 170. Some publishers 140 may use the same SSP 170.

Digital component providers 160 can create (or otherwise publish) digital components that are presented in digital component slots of publisher's resources. The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources and/or applications of multiple different publishers 140.

In general, a DSP 150 can receive requests for digital components (e.g., from an SSP 170), generate (or select) a selection value for one or more digital components created by one or more digital component providers based on the request, and provide data related to the digital component (e.g., the digital component itself) and the selection value to an SSP 170. The selection value can indicate an amount that the digital component provider 160 is willing to provide for presentation or user interaction with the digital component.

As described in more detail below, the MPC cluster 130 can send the contextual data of a digital component request to the SSP 170 for the resource for which digital components are being requested. The SSP 170 can send the contextual data to one or more DSPs 150, receive digital components (or data that references digital components) and selection values from the DSPs 150, and provide at least some of the digital components (or their data) to the MPC cluster 130. For example, the SSP 170 can be configured to filter some digital components from being eligible for selection for an electronic resource of a publisher 140, e.g., based on exclusions specified by the publisher 140.

In some cases, it is beneficial to a user to receive digital components related to their interests, which can be inferred based on their interactions with electronic resources, e.g., based on electronic resources visited by the users. To provide digital components based on interests, while preserving the privacy of the users, users can be assigned to user groups in various ways. However, such membership can be stored at the client device 110, e.g., by a trusted program, such that no entity other than the user can access the data identifying the user groups to which the user has been assigned. This can also provide transparency to the user, e.g., by enabling the user to view the user groups to which the user has been assigned, remove the user from such user groups, and/or select which user groups can be used in selecting digital components for presentation to the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

As mentioned above, to protect user privacy, a user's group membership can be maintained at the user's client device 110, e.g., by one of the applications 112 or the operating system of the client device 110, rather than by a digital component provider, content platform, or other party. In a particular example, a trusted program (e.g., a web browser or the operating system) can maintain a list of user group identifiers ("user group list") for a user using the web browser or another application (e.g., for a user logged into the browser, application, or the client device 110). The user group list can include a group identifier for each user group that includes the user as a member. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

The MPC cluster 130 can use the user group membership of a user to select digital components or other content that may be of interest to the user or may be beneficial to the user/user device in another way. For example, such digital components or other content may include data that improves a user experience, improves the running of a client device 110 or benefits the user or client device 110 in some other way. However, the user group identifiers of the user group list of a user can be provided and used to select digital components in ways that prevent MPC1 and MPC2 of the MPC cluster 130 from accessing the user group identifiers for the user in cleartext, thereby preserving user privacy when using user group membership data to select digital components. Cleartext is text that is not computationally tagged, specially formatted, or written in code, or data, including binary files, in a form that can be viewed or used without requiring a key or other decryption device, or other decryption process. For example, the user group membership information can be sent to the MPC computers of the MPC cluster 130 in the form of secret shares and the MPC computers can perform a secure MPC process to select digital components based on the user group membership of the user. By sending the information in secret shares, no entity including the MPC computers can access the user group membership absent unauthorized collusion between the MPC computers, thereby enhancing user privacy and data security.

The secure MPC cluster 130 includes two computers MPC1 and MPC2 that perform secure MPC processes to select digital components for distribution to client devices of users based on the user's group membership, but without accessing the group membership information in cleartext. Although the example MPC cluster 130 includes two MPC computers, more MPC computers can also be used as long as the MPC cluster 130 includes more than one computer. For example, the MPC cluster 130 can include three computers, four computers, or another appropriate number of computers. Using more computers in the MPC cluster 130 can provide more security, but can also increase the complexity of the MPC processes.

Each MPC computer, e.g., MPC1 and MPC2, can be operated by different entities. In this way, each entity may not have access to the users' group membership in cleartext. For example, one of MPC1 or MPC2 can be operated by a trusted party different from the users, the publishers 140, the DSPs 150, the SSPs 170, and the digital component providers 160. For example, an industry group, governmental group, or browser developer may maintain and operate one of the computers MPC1 or MPC2. The other of MPC1 or MPC2 may be operated by a different one of these groups, such that a different trusted party operates each of MPC1 and MPC2. Preferably, the different parties operating the different MPC computers have no incentive to collude to endanger user privacy. In some implementations, the MPC computers are separated architecturally and are monitored to not communicate with each other outside of performing the secure MPC processes.

MPC1 and MPC2 can each store digital components (e.g., the creatives for the digital components), selection values for digital components, and other data for digital components. For example, MPC1 and MPC2 can cache selection values and other data for digital components previously received from SSPs 170 and/or DSPs 150 as part of previous digital component selection processes or that are otherwise provided to MPC1 and MPC2, e.g., that are provided in advance for use in digital component selection processes. In this way, the MPC cluster 130 can use the selection values and other data to select digital components for distribution to client devices 110 in response to future digital component requests received from client devices 110.

A digital component for which a selection value and other information is stored by the MPC cluster 130 for digital component selection processes can be referred to as a stored digital component in this document. However, the digital component itself is not necessarily stored by the MPC cluster 130. Instead, the MPC cluster 130 can store data, e.g., code that references a network location from which the digital component can be downloaded, for each stored digital component. In some implementations, the digital component itself is stored, and is returned to the application 112 directly, by the MPC cluster 130. Such implementation reduces the need for application 112 to fetch the digital components, and/or other information for digital components, in additional requests that may consume battery and bandwidth of the device, and may leak additional signals for the server hosting the digital component itself to track the device.

For each stored digital component, MPC1 and MPC2 can each store a selection value or a vector of values that can be used by MPC1 and MPC2 to determine a selection value for the digital component. In some implementations, the digital component, its selection value or vector, and any other data for the digital component is stored in the form of a byte array or other appropriate data structure, which can also be referred to as a digital component information element.

MPC1 and MPC2 can also store, for each digital component or for at least some digital components that have corresponding conditions, condition data that defines condition(s) that must be met for the digital component to be a candidate for a given digital component selection process. A stored digital component can have zero or more corresponding conditions. These conditions can be referred to as candidate conditions. As described in more detail below, the condition data can be in the form of a candidate expression with candidate parameters, which can be a Boolean expression that is evaluated by MPC1 and MPC2 to determine whether the digital component is a candidate for selection in a digital component selection process.

One example condition is that the user to which a selected digital component will be provided is a member of a user group corresponding to the stored digital component. This condition can be referred to as a user group membership condition. In this example, MPC1 and MPC2 can store, for a stored digital component, a set of one or more user group identifiers that correspond to the digital component. These user group identifiers identify the user groups for which the stored digital component can be provided. That is, the stored digital component is only a candidate for a digital component selection process that is performed to select a digital component to provide to a user that is a member of at least one of the user groups identified by the set of one or more user group identifiers for the stored digital component. The user group membership can also be a negative distribution criteria, e.g., the digital component is not eligible to be presented to a user if the user is a member of the group.

Another example condition for a stored digital component is a frequency cap condition that indicates that the digital component, or digital components of a particular category, can only be provided to the same user a maximum number of times over a given time duration. Another example condition for a digital component is a blocked digital component condition that indicates that the digital component has been blocked, e.g., muted, by a user. For these example conditions. MPC1 and MPC2 can receive, for each of multiple users, a probabilistic data structure, e.g., a cuckoo filter or Bloom filter, that represents digital components that cannot be provided to the user. For example, the probabilistic data structure can represent universal identifiers for digital components that are blocked either by the user directly or due to the frequency at which the digital component is displayed to the user being exceeded during the given time duration. Another example condition that can be checked is whether the user is a member of a user group such as a “minor age group”. Some digital components are not eligible to presented to minors. By encoding whether the user is a minor as secret shares, no entity, not even MPC1 or MPC2 without colluding, could learn whether the user is a minor. The disclosed techniques protect user privacy with cryptographic guarantees that prevent presenting age-inappropriate digital components to minors.

MPC1 and MPC2 can receive the probabilistic data structures from the client devices 110 of the users, e.g., in an encrypted form that prevents either MPC1 or MPC2 from accessing the identifiers in cleartext. For example, the application 112 running on a user's client device 110 can generate a Bloom filter that represents the identifiers for the blocked digital components that are blocked due to frequency capping, blocked by the user, or blocked for other reasons such as the user's age. The application 112 can then provide data to each of MPC1 and MPC2 that enable MPC1 and MPC2 to collaboratively query the Bloom filter using a secure MPC process to determine whether a given digital component is blocked for the user. MPC1 and MPC2 calculate secret shares of a blocked digital component condition using the secure MPC process. In some implementations, the MPC cluster 130 discards the probabilistic data structures after selecting digital components from the client devices 110.

Another example condition for a stored digital component is a pacing condition that paces the distribution of the digital component over a time duration. MPC1 and MPC2 can store data that indicates the total number of times the digital component can be provided over a time duration and/or a maximum budget for the digital component for the time duration. MPC1 and MPC2 can use this information to pace how often the digital component can be a candidate for digital component selection processes based on this condition (e.g., all conditions for the digital component would have to be satisfied for the digital component to be a candidate). In some implementations, MPC1 and MPC2 can implement a feedback controller, e.g., a proportional-integral-derivative (PID) controller using secret shares to pace stored digital components that have a pacing condition.

In this example, MPC1 and MPC2 can store the setpoint for the feedback controller for a digital component and maintain the measured variable for the feedback controller for the digital component. In general, a PID controller is a feedback controller that uses an error value, which is a difference between a target setpoint and a measured variable, to determine an output that drives the measured variable towards the setpoint. In the context of pacing the distribution of digital components to client devices, the setpoint for a campaign can be an impression rate, an interaction rate, a conversion rate, and/or a resource depletion rate (e.g., a budget spend rate). Similarly, the measured variable can be an impression rate, an interaction rate, a conversion rate, and/or a resource depletion rate over a given time duration. MPC1 and MPC2 can also store the tuning parameters for each PID controller. The setpoint, measured variable, and tuning parameters can be stored in secret shares (with each computer MPC1 and MPC2 storing a corresponding share of each parameter) or in cleartext depending on the target privacy/data security.

Another example condition is a k-anonymity condition. A k-anonymity condition can include a k-anonymity rule that requires that a digital component be eligible (or would have been selected) for distribution to at least k users over a given duration of time. The concept of k-anonymity ensures that data for a particular user is not distinguishable from the data of a threshold number k of other users. The system can enforce a k-anonymity rule, for example, by ensuring that a particular digital component is distributed to a client device 110 in response to a request for one or more digital components, and the same digital component could have been, or was, displayed to a set of at least k users or by at least k applications 112 within a particular period of time. In some implementations, each of the k applications 112 to which the digital component could have been, or was distributed must be for a different user. In this example, MPC1 and MPC2 can store, for a digital component, the value k and maintain a number of users to which the digital component could have been distributed.

To determine the number of users that a digital component could have been displayed can include executing a counterfactual digital component selection process in parallel with each actual digital component selection process. In this counterfactual digital component selection process, all digital components can be candidates if they satisfy all conditions other than the k-anonymity condition. If the digital component is selected for at least k users or applications 112 in the counterfactual digital component selection processes, the digital component would have been displayed to k users if not for the k-anonymity condition. Once this happens, the digital component which satisfies the k-anonymity condition can be included in the actual digital component selection processes (assuming the other conditions, if any, for the digital component are satisfied), which does not include digital components that have an unsatisfied k-anonymity condition.

Another example condition is an exclusion condition. For example, a digital component provider 160 may not want its digital component(s) to be displayed with digital components of other digital component providers, digital components of particular categories, digital components related to particular brands, and/or digital components having particular characteristics. If one of the excluded digital components has been selected for one of the multiple digital component slots of a digital component request, then the digital component would not be a candidate for selection for any of the other digital component slots of the digital component request.

Another example condition is an inclusion condition. For example, a digital component provider 160 may want its digital component(s) to be displayed with digital components of other digital component providers, digital components of particular categories, digital components related to particular brands, and/or digital components having particular characteristics. If a digital component satisfying an inclusion condition has been selected for one of the multiple digital component slots of a digital component request, the digital component would now become a candidate for selection for the subsequent digital component slots of the digital component request, assuming each other condition for the digital component is satisfied.

Other appropriate conditions can also be used to determine whether digital components are candidates for a selection process to select a digital component for a digital component slot. Each digital component provider 160 or a content platform (e.g., DSP 150) for the digital component provider 160 can provide the condition data for the provider's digital component(s) to the MPC cluster 130.

As described above, the condition data for a digital component can be in the form of a candidate expression. A candidate expression can be a Boolean expression that includes multiple condition parameters and Boolean operators. In this example, a digital component can be a candidate for selection in a digital component selection process if the candidate expression evaluates to a value of True (or one). If not, the digital component may not be a candidate and therefore cannot be selected by the MPC cluster 130 for that digital component selection process.

The candidate expression and the candidate parameters can be received and stored in the form of secret shares by MPC1 and MPC2. For example, MPC1 can receive and store a first secret share of the candidate expression for a digital component and MPC2 can receive and store a second secret share of the candidate expression for the digital component. In addition, each MPC computer can store a respective secret share of the value of each candidate parameter for each candidate expression.

In some implementations, each stored digital component can also be associated with, e.g., linked to, contextual conditions that define the context in which the digital component is eligible for display or a particular selection value (or particular vector) for the digital component is eligible for use in a digital component selection process. For example, a digital component may only be eligible for display with particular resources of particular URLs or in particular geographic regions. In another example, a digital component can have different selection values that each correspond to different sets of contextual conditions, enabling flexibility in selection values based on context.

MPC1 and MPC2 can identify eligible digital components for a digital component request based on the contextual data of the digital component request and the contextual conditions for the digital components. In some implementations, MPC1 and MPC2 compare, for each digital component, each contextual signal to a corresponding eligibility condition. For example, MPC1 and MPC2 can compare the URL of a digital component request to the eligible URLs for a digital component, which can be expressed as an eligibility condition.

In some implementations, each digital component is stored in a table or other appropriate data structure with a lookup key that includes contextual data for which the digital component is eligible. In this example, MPC1 and MPC2 can identify eligible digital components by comparing the contextual data of the digital component request to the lookup key of each digital component in the data structure.

When the MPC cluster 130 receives a digital component request from a client device 110, each MPC computer of the MPC cluster 130 can identify a set of eligible digital components using the contextual data of the digital component request. The MPC cluster 130 can perform secure MPCs to select, from the eligible digital components, a digital component for each digital component slot of the digital component request using the candidate expressions and selection values for the digital components. The MPC cluster 130 can send secret shares of a selection result for each selected digital component to the client device 110. As described in more detail below, the selection result for a digital component can be a selected digital component or of data for the digital component, e.g., the byte array for the digital component. The MPC cluster 130 can provide the secret shares of each selection result to the client device 110, where the application 112 can combine the secret shares to access each selected digital component in cleartext and present each digital component.

In general, an electronic resource such as a web page or application page, can include multiple digital component slots. In some implementations, the application 112 can generate and transmit a single digital component request (referred to as a composite digital component request) for obtaining digital components for the multiple slots rather than obtaining digital components for each slot separately. The following description provides an example data flow for selecting digital components for multiple digital component slots.

Figure 2:
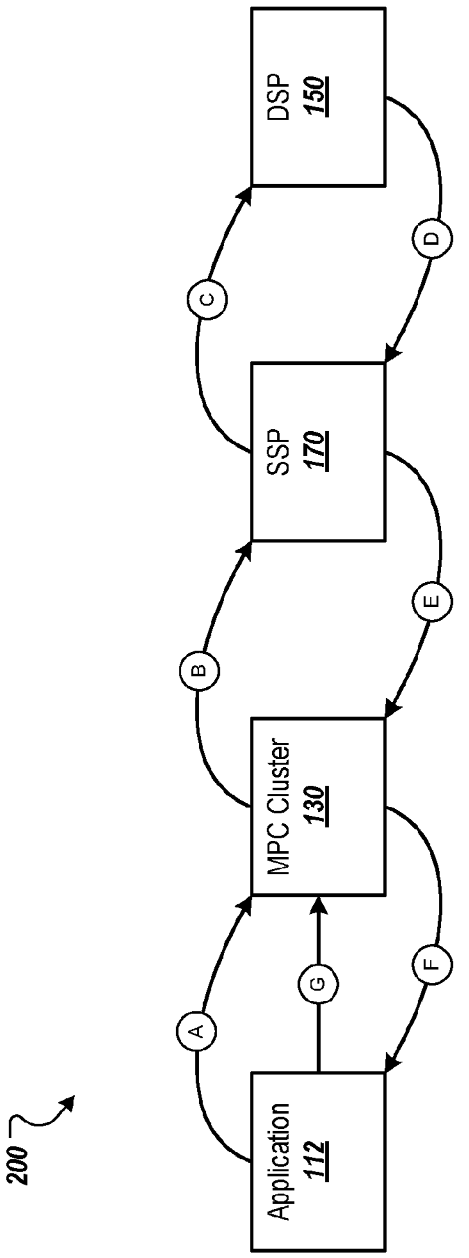
FIG. 2 is a data flow diagram of an example process for selecting digital components for display at or distribution to a client device

FIG. 2 is a data flow diagram of an example process 200 for selecting digital components for display at or distribution to a client device. Operations of the process 200 can be implemented, for example, by the application 112 on client device 110, the MPC computers (e.g., MPC1 and MPC2) of the MPC cluster 130, and content platforms (e.g., DSP(s) 150 and SSP(s) 170). Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two MPC computers can also be used to perform similar processes.

This description includes two types of selection values-selection values that are conditioned on either sensitive user information, such as user group, or parameters whose changes in value can allow unscrupulous parties to infer the sensitive information, or "conditional selection values" and selection values that are not conditioned on sensitive information, or "unconditional selection values."

This structure allows the MPC cluster 130 to protect user privacy and other confidential information, and to prove its trustworthiness to application providers, such as a provider of application 112. In this example, the MPC cluster 130 relies on secure 2-Party computation (2PC) architecture, which applies cryptography techniques to guarantee that, if at least one of the two computers of the MPC cluster 130 is honest, there is no leaking of confidential user data or other confidential information. If the MPC cluster 130 includes more than two computers, the same MPC protocol with minor enhancement to support multiple computers can be used. This modification is known in the art and involves sharing the secret and the computational result among a suitable multitude of servers, or any subset of a large enough group of servers.

The MPC cluster 130 runs the secure 2PC protocol to evaluate and apply conditions to select eligible digital components for each digital component slot, conduct selection processes to select multiple digital components, e.g., based on the selection value for each candidate digital component. The MPC cluster 130 can repeat the 2PC protocol multiple times to select a digital component slot for each digital component in sequence and return a winning digital component for each of the multiple slots to the client device 110. All of these processes can be performed using secure MPC and secret sharing techniques.

The process 200 begins with stage A, in which application 112 sends a composite request for a digital component to the MPC cluster 130. The composite request includes information used in a digital component selection process, including information that can be sensitive, such as identifiers of user groups to which the application 112 is mapped or otherwise associated (e.g., based on the user being a member of the user groups), and information that is not classified as being sensitive, such as contextual data regarding the context in which the digital component will be presented (e.g., displayed). As described in further detail below, the design of system 100 improves the protection and security of user data that can be sensitive or confidential by using secret shares of sensitive information for each MPC computer of the MPC cluster 130 so that no single entity, including the MPC computers, other than the client device 110 has access to sensitive information in cleartext.

In some implementations, the composite request includes multiple digital component requests. For example, the composite request includes a contextual request that includes the contextual data and a user group based request that includes the user group identifiers for the user groups that include the user as a member. The user group information can be provided in the form of secret shares. For example, MPC1 can receive a first secret share of the user group identifier for each user group and MPC2 can receive a second secret share of the user group identifier for each user group. Each secret share is meaningless unless combined with its other corresponding secret share. In this way, absent unauthorized collusion between MPC1 and MPC2, no entity other than the client device 110 has access to any user group identifier for the user in cleartext.

In some implementations, to reduce bandwidth consumption and the client device's battery consumption, the client device 110 can send the secret shares for each MPC computer (e.g., MPC1 and MPC2) in the composite request to one of the MPC computers (e.g., MPC1). To prevent MPC1 from accessing the secret shares designated for MPC2, the client device 110 can encrypt the secret shares for MPC2 using an encryption key (e.g., public key) of MPC2 such that only MPC2 can decrypt the secret shares using its decryption key (e.g., private key).

The process 200 continues with stage B, in which the MPC cluster 130 transmits a contextual digital component request to an SSP 170. The contextual digital component request can contain contextual data, e.g., various contextual signals, received from the client device 110. For example, this contextual digital component request can include any of the contextual data described herein. The contextual request provided to SSP 170 does not, however, include sensitive information, such as user group identifiers.

The process 200 continues with stage C, in which SSP 170 forwards the contextual request, e.g., for multiple digital components, to one or more DSPs 150. In this particular example, and for simplicity, SSP 170 forwards the contextual request to a single DSP 150. In this example, DSP 150 has digital components and selection values mapped to the digital components.

The process 200 continues with stage D, in which the one or more DSPs 150 return selection values (or vectors for determining selection values) in response to the contextual request for multiple digital components. For each digital component slot of the resource for which the client device 110 has requested digital components. DSP 150 can return one or more selection values that are each mapped to a digital component responsive to the contextual request. DSP 150 can return any number of selection values responsive to the contextual request.

The process 200 continues with stage E, in which SSP 170 provides at least a portion of the digital components to the MPC cluster 130. In some implementations, SSP 170 filters some of the digital components and provides the filtered set of digital components to the MPC cluster 130. For example, SSP 170 can apply content selection rules to the digital components received from the DSP(s) 150. For example, SSP 170 applies rules such as content provider and digital component blocking rules that prevent particular content providers from being eligible to provide candidate digital components and selection values, or particular digital components from being candidates. In some implementations, the application 112 can maintain a set of blocked identifiers that includes identifiers of digital components that have been expressly blocked by the user and block digital components that have the identifier from being sent to the MPC cluster 130 for digital component selection processes that are performed to select digital components for distribution to the user's client device 110. SSP 170 can be configured to perform other appropriate filtering processes, e.g., specific by users and/or publishers. In some implementations, SSP 170 blocks digital components that may be harmful for client devices (e.g., malware).

The process 200 continues with stage F, in which the MPC cluster 130 performs secure MPC processes to select a digital component for each digital component slot for which a digital component was requested in the digital component request. For each digital component slot, the MPC cluster 130 can generate selection results that include secret shares of data for the selected digital component, e.g., secret shares of the digital component itself (e.g., the creative), the byte array for the digital component, a reference to where the digital component can be downloaded, and/or other appropriate data for the selected digital component. For example, as the result of the selection process for a digital component slot, MPC1 can store a first secret share of the selection result and MPC2 can store a second secret share of the selection result. One of the MPC computers (e.g., MPC1 or MPC2) can provide a composite result that includes, for each digital component slot, a first secret share of the selection result held by MPC1 and an encrypted second secret share of the selection result held by MPC2 (encrypted using an encryption key of the client device 110 such that the client device 110 can decrypt the second secret share of the selection result).

The process 200 continues with stage G, in which the application 112 presents the digital component selected for each digital component slot. As the selection results are in secret shares, application 112 can first combine the secret share of each selection result with the second secret share of the selection result to obtain the selection result in cleartext. The application 112 can then present the digital component in its digital component slot. The application 112 can also provide an impression notification or a click notification when the user interacts with the presented digital component to the MPC cluster 130. This impression notification includes data that allows the MPC cluster 130 to update information relevant to updating counters that allow the MPC cluster 130 to enforce conditions described herein.

Figure 3:
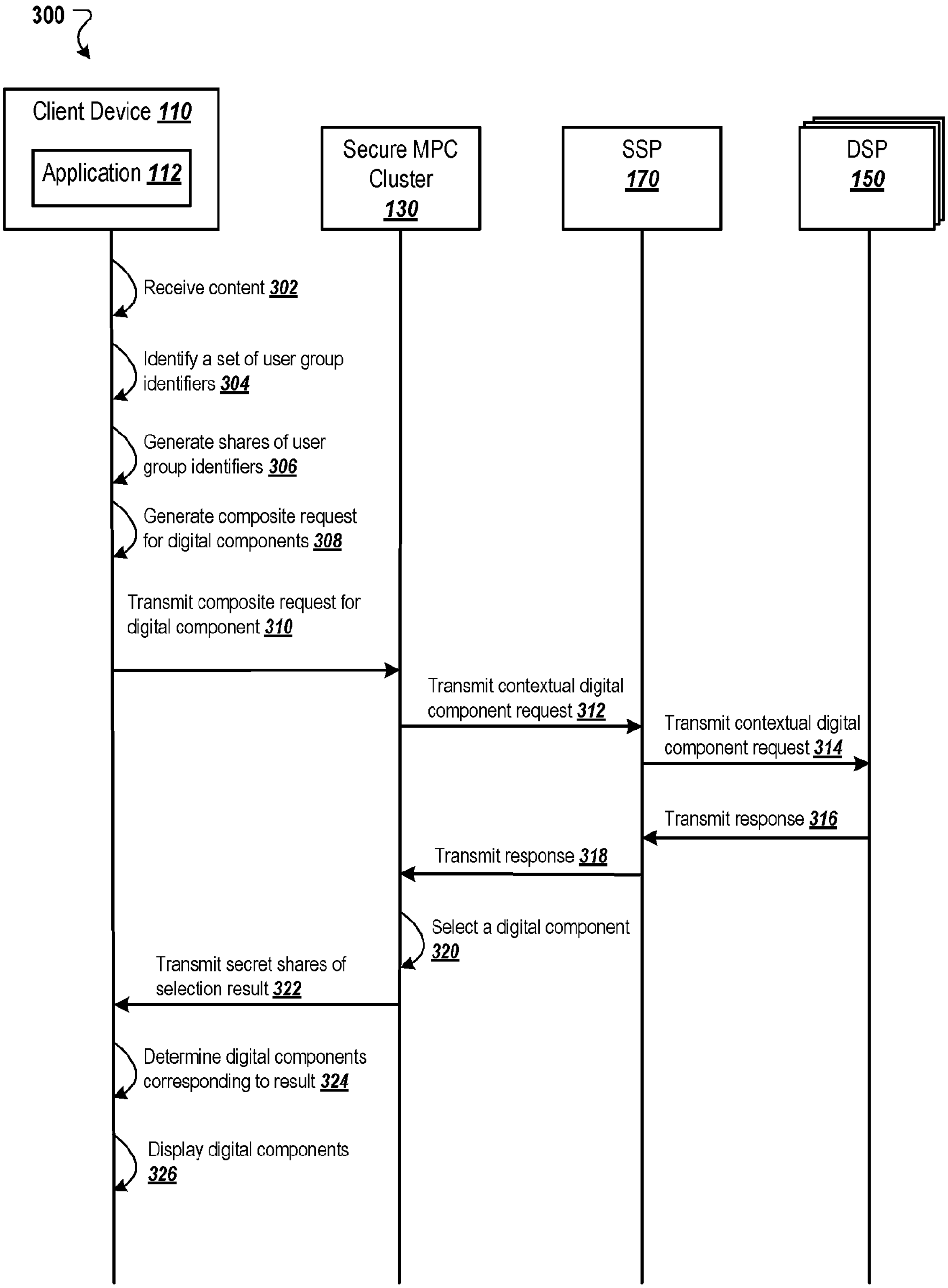
FIG. 3 is a swim lane diagram of an example process for selecting and distributing multiple digital components to a client device.

FIG. 3 is a swim lane diagram of an example process 300 for selecting and distributing multiple digital components to a client device. Operations of the process 300 can be implemented, for example, by the client device 110, the MPC computers (e.g., MPC1 and MPC2) of the MPC cluster 130, the SSP(s) 170, and the DSP(s) 150. Operations of the process 300 can also be implemented as instructions stored on one or more computer readable media which may be non-transitory, and execution of the instructions by one or more data processing apparatus can cause the one or more data processing apparatus to perform the operations of the process 300. Although the process 300 is described in terms of a two computer MPC cluster 130, MPC clusters having more than two computers can also be used to perform similar processes.

The application 112 receives content (302). For example, the client device 110 can receive an electronic resource (e.g., web page, application page) for display by a web browser, native application, or other type of application. The resource can include multiple digital component slots that include computer-readable code, e.g., scripts, that, when executed, cause the client device 110 to generate and transmit a composite request for a digital component for each of the multiple slots. The client device 110 can render the content on a display of the client device 110.

The application 112 identifies a set of user group identifiers (304). The set of user group identifiers can be the user group identifiers for the user groups that include the user as a member. For example, the set of user group identifiers can be the user group identifiers in the user group list for the user described above. The application 112 that renders the content or a trusted program can identify the set of user group identifiers, e.g., by accessing the user group list from secure storage of the client device 110 or obtaining the list from the trusted program.

The client device 110 generates secret shares of user group identifiers (306). As described above, secret shares of a piece of data is meaningless on its own but, when combined, result in the cleartext representation of the piece of data. Example forms of secret shares that can be used are additive secret shares (add the secret shares to obtain the cleartext representation) and XOR secret shares (perform an XOR operation between the secret shares to obtain the cleartext representation). In some implementations, the client device 110 generates respective secret shares of each user group identifier that includes the user as a member.

To securely and efficiently generate a digital component request based on user group identifiers, the application 112 can use probabilistic data structures, such as a cuckoo filter or a Bloom filter. The application 112 can populate the probabilistic data structure based on the user groups that include the user as a member, e.g., using hash functions. This enables the MPC cluster 130 to query the probabilistic data structure using the hash functions to determine which user groups include the user as a member. The probabilistic data structures are compact representations of a group of data, which reduces the battery consumption of client devices 110 that send the user group membership information and the amount of consumed bandwidth to transmit the user group membership information across the network 105.

The application 112 generates a composite request for digital components (308). The composite request can include contextual data and secret share(s) of user group identifiers for the user. As described above, the contextual data can include, for example, data about the electronic resource with which the digital component will be presented, data about the digital component slot(s) of the electronic resource, coarse geographic data, the spoken language setting of the application 112 or client device 110, and/or other appropriate contextual data. In some implementations, the contextual data can be part of a separate request of the composite request that can simply be forwarded on to content platforms (e.g., SSP 170 and DSP 150).

The composite request can include, for each user group that includes the user as a member, a respective secret share of the user identifier for the user group identified by the user group identifier for each MPC computer of the MPC cluster 130. For example, the composite request can include, for a user group, a first secret share for MPC1 and a second secret share for MPC2. As the composite request may be sent to one of the MPC computers rather than all MPC computers, the application 112 can encrypt at least some of the secret shares. For example, if the composite request is sent to MPC1, the application 112 can encrypt the secret shares for MPC2 using an encryption key (e.g., public key) of MPC2 such that only MPC2 can decrypt the secret shares meant for MPC2.

In some implementations, the composite request includes multiple sub-requests. The sub-requests can include the contextual digital component request and a user group request for each MPC computer of the MPC cluster. Each user group request can include the secret shares of the user group identifiers for a particular MPC computer. The content of each user group request can be encrypted using an encryption key (e.g., public key) of the corresponding MPC computer.

The application 112 sends the composite request for digital components to the MPC cluster 130 (310). The application 112 can transmit the composite request to one of the MPC computers of the MPC cluster 130. For example, the application 112 can transmit the composite request to MPC1. MPC1 can keep the first secret share of each user group identifier and transmit the encrypted secret shares of the user group identifiers to their corresponding MPC computers. For example, MPC1 can send the encrypted second secret share for each user group identifier to MPC2. MPC2 can use its decryption key (e.g., its private key) to decrypt the secret shares to obtain their respective secret shares in cleartext. However, even with the secret shares in cleartext, MPC2 would not be able to access the user group identifier in plaintext without the other secret share(s) held by the other MPC computer(s), e.g., without the first secret share of the user group identifier held by MPC1.

The MPC cluster 130 sends a contextual digital component request to the SSP 170 (312). In some implementations, the MPC cluster 130 can use the contextual data of the composite request to generate a contextual digital component request for obtaining digital components from the SSP 170 for the multiple digital component slots. MPC1 then sends the contextual digital component request to the SSP 170. For example, the MPC1 of the MPC cluster 130 generates and transmits the contextual digital component request to the SSP 170. In some implementations, MPC1 can send a contextual request that is included in the composite request to SSP 170. In some implementations, the application 112 or the client device 110 can encrypt the contextual request using the SSP's public key so that only SSP 170 can decrypt the contextual request. This encryption design helps to improve the overall security because even if MPC1 is compromised, the attacker can't access content of the contextual request in cleartext. This design complies with the 'data minimization' security principal The SSP 170 sends the contextual digital component request to one or more DSPs 150 (314). In some implementations, the SSP 170 can forward the contextual digital component request to one or more DSPs 150 for obtaining digital components for the multiple digital component slots. However, the SSP 170 can also transmit a separate digital component request that includes the contextual signals for each of the multiple digital component slots of the electronic resource. In other words, the SSP 170 can send a separate digital component request for each digital component slot of the electronic resource.

The DSP 150 sends a response to the SSP 170 (316). The DSPs 150 can respond to the contextual digital component request with data indicating one or more digital components for each of the multiple digital component slots. For each digital component, the response can include data identifying the digital component, the selection value for the digital component, and metadata (or other additional information) for the digital component.

In some implementations, the response can include, for a digital component, a candidate expression that can be used to determine whether the digital component is a candidate for a digital component selection process. For example, the DSP 150 can provide a candidate expression for digital components to be stored at the MPC cluster 130 for future digital component selection processes in addition to the digital component selection process corresponding to the received contextual digital component request.

In some implementations, the response can include one or more vectors of values used to determine a selection value, e.g., rather than a static selection value. For example, the DSP 150 can provide a user group-based vector of values and/or a contextual vector of values.

The user group-based vector can include multiple elements across two or more dimensions and each element can represent a particular feature of a digital component presentation opportunity. For example, the user group-based vector of values can include elements for geographic locations or regions, spoken languages, ages or age ranges, particular URLs of web pages or other electronic resources, particular products or services, whether a digital component slot is above or below the fold, the type of digital component slot, the size of the digital component slot, the number of digital component slots on the electronic resource, the time of day, web property identifier, and/or other appropriate features of digital component presentation opportunities. In some implementations, the user group-based vector can be in an arbitrary embedding space where each dimension of the embedding space is chosen by the digital component providers for implementing machine learning models.

Each user group-based vector can be specific to a particular user group. That is, the values of the user group-based vector can be for use when the digital component is being considered for selection for users that are members of a particular user group. Each user group-based vector can be mapped to its corresponding user group identifier. That is, the MPC computers of the MPC cluster 130 can store the user group-based vector for a digital component in a way that links the user group-based vector to the digital component so that the user group-based vector can be used in subsequent digital component selection processes.

Each contextual vector can be for a particular contextual digital component request. The contextual vector can include the same structure as the user group-based vector, e.g., with the same elements. However, the DSP 150 can select the values within the contextual vector based on the contextual data of the current contextual digital component request.

To determine a selection value using the vectors, the MPC cluster 130 can determine a dot product of the two vectors. For example, if a user is a member of a user group corresponding to a user group-based vector and the DSP 150 provided a contextual vector for the current contextual digital component request, the MPC cluster 130 can determine the dot product of the two vectors to determine the selection value for the digital component for use in the digital component selection process.

The SSP 170 provides the responses to the MPC cluster 130 (318). As described above, the SSP 170 can filter the digital components received from DSPs 150 prior to providing the digital components to the MPC cluster 130.

The MPC cluster 130 performs a secure MPC process to select a digital component to provide to the client device 110 (320). This selection process can include identifying a set of digital components and their corresponding selection values that are eligible for the digital component selection process based on contextual signals, e.g., using a lookup key, as described above with reference to FIG. 1. This can also include identifying, from the set of digital components, candidate digital components that are candidates for selection based on whether the candidate expression for the digital component is satisfied. The set of candidate digital components can also include unconditional digital components that do not have candidate expressions, e.g., that do not have such conditions to be evaluated.

As described in more detail below, identifying the candidate digital components and selecting the digital components for presentation in multiple digital component slots of an electronic resource can be performed in a sequence. For example, the MPC cluster 130 can perform a secure MPC process to select candidate digital components for the first digital component slot followed by selecting candidate digital components for subsequent digital component slots. The sequence in which digital components are selected for digital component slots can be specified by the publisher of the resource for which the digital components are being selected. For example, the composite digital component request can include a sequence of digital component slots for which digital components are to be selected.

While selecting digital components for multiple digital component slots of an electronic resource, the MPC cluster 130 can maintain secret shares of the values of the candidate parameters for the candidate expression for each conditional digital component that has a candidate expression. Some of these values can change based on the digital component selected for one of the other digital component slots. For example, if a first digital component has an exclusion condition that specifies that it cannot be displayed concurrently with a second digital component that has been selected for one of the digital component slots, the MPC computers can update the candidate parameter that represents this exclusion condition for the first digital component to indicate that the first digital component is not a candidate (e.g., is not eligible for selection).

For each digital component slot, the MPC cluster 130 can select, from the candidate digital components for the digital component slot, a digital component to provide to the client device 110 in response to the digital component request based on the selection values for the candidate digital components. For digital components having a selection value determined using vectors, the MPC cluster 130 can determine the selection value for the digital component by determining a dot product of the vectors, e.g., the user group-based vector and the contextual vector. The MPC cluster 130 can repeat the selection process for each digital component slot to select a digital component for the digital component slot.

The MPC cluster 130 transmits secret shares of a selection result to the client device 110 (322). The selection result for each digital component slot can include the secret shares of the digital component and/or data for the digital component (e.g., the byte array for the digital component). In some implementations, one of the MPC computers (MPC1) sends a composite result that includes the secret shares for the digital component for each digital component slot. In this example, the composite result can include the first secret share for each selected digital component held by MPC1 and an encrypted second secret share for each selected digital component held by each other MPC computer of the MPC cluster 130 (e.g., the second secret share of each selected digital component held by MPC2). The composite result can also include data indicating which selected digital component is to be presented in each digital component slot.

In some implementations, the MPC cluster 130 can also send a selection process identifier for the digital component selection process to the client device 110. The selection process identifier can uniquely identify the digital component selection process for which the selection result was generated. For example, MPC1 and MPC2 can each generate a respective selection process identifier SPID for each digital component request for which MPC1 and MPC2 perform a selection process to generate a selection result to provide to a client device 110. In some implementations, the selection process identifier SPID can be a nonce or an opaque alphanumeric or numeric sequence.

The MPC cluster 130 can also store data for the selection values that were part of the selection process keyed by, or otherwise linked to, the SPIDs. For example, MPC1 can store a table or other data structure that includes data for the selection values with a key that is based on the SPID1 generated by MPC1 for the selection process. Similarly, MPC2 can store a table or other data structure that includes data for the selection values with a key that is based on the SPID2 generated by MPC2 for the selection process. This enables the MPC cluster 130 to update the process variables for the feedback controllers based on data received from the client device 110. In some implementations, the MPC cluster 130 can also store other values that are a part of the system log that can be used for many offline processes.

The client device 110 determines digital components that correspond to the selection result(s) (324). For each digital component in the composite selection result received by the client device 110, the client device 110 can determine the selection result from the two secret shares. For example, using an additive secret share library as described in more detail below, the client device 110 can add the two secret shares of the selection result together to obtain the selection result in cleartext. This gives the client device 110 access to the digital component and/or the metadata for the digital component, e.g., the identity of the digital component, the location from which the client device 110 can download the digital component, etc. For example, if the selection result is the byte array for a digital component, the client device 110 can access the byte array for the selected digital component by combining the secret shares of the selection result that represents the byte array.

The client device 110 presents the digital components (326). For example, the application 112 can display multiple digital components with the content of the electronic resource. The application 112 can display each digital component in its respective digital component slot using the data of the composite result.

FIG. 4 is a swim lane diagram of an example process 400 for selecting a digital component for each digital component slot of a resource. Operations of the process 400 can be implemented, for example, by the MPC computers MPC1 and MPC2 of the MPC cluster 130. Operations of the process 400 can also be implemented as instructions stored on one or more computer readable media which may be non-transitory, and execution of the instructions by one or more data processing apparatus can cause the one or more data processing apparatus to perform the operations of the process 400.

MPC1 identifies eligible digital components (402). MPC1 can identify eligible digital components for a digital component request received from a client device 110, e.g., as described with reference to FIG. 3. An eligible digital component is a digital component that is eligible for selection based on the contextual signals of the digital component request. For example, an eligible digital component can be a digital component having a set of contextual signals that match contextual signals of the digital component request, e.g., a digital component having a lookup key that matches the lookup key of the request.

MPC2 identifies eligible digital components (404). MPC2 can identify eligible digital components for a digital component request received from a client device 110. The MPC2 can identify eligible digital components in a similar manner as MPC1.

MPC1 and MPC2 determine, and/or identify, selection values for digital components (406). MPC1 and MPC2 can determine the selection values in response to a digital component request received from a client device 110. As described with reference to FIG. 3. MPC1 can receive, from the client device 110, a composite request for digital components that includes contextual signals and secret shares of user group identifiers for user groups that include the user of the client device 110 as a member.

MPC1 and MPC2 can each obtain data about digital components. The digital components can include stored digital components that are stored by MPC1 and MPC2 and digital components received in response to a contextual digital component request sent to one or more content platforms (e.g., to SSP(s) 170 and DSP(s) 150).

Some digital components have static selection values that MPC1 and MPC2 can obtain from memory for these digital components. Some digital components have dynamic selection values that are determined using vectors and that vary based, for example, on the contextual data for the current digital component request. For these digital components, MPC1 and MPC2 can determine the selection values based on the dot product of the vectors and the contextual data of the digital component request.

MPC1 and MPC2 can obtain the selection values for the digital components once for the multiple digital component slots and thus the multiple selection processes of a digital component request. As accessing the selection values and/or vectors from memory and computing the dot products of vectors for many digital components can be computationally expensive and time consuming, obtaining the selection values once rather than multiple times can provide substantial improvements in resource efficiency and latency.

If there is a selection value floor for the electronic resource, e.g., specified by the publisher of the electronic resource or the DSP 150 or the digital component provider 160, MPC1 and MPC2 can apply the floors at this point in the process 400. For example, MPC1 and MPC2 can compare the selection value for each digital component to the floor. If a digital component has a selection value that does not satisfy the floor, e.g., that does not meet or exceed the floor, MPC1 and MPC2 can filter the digital component such that the digital component is no longer eligible for selection.

For each digital component slot for which a digital component is being requested, the MPC computers MPC1 and MPC2 of the MPC cluster 130 perform a secure MPC process to select a digital component and generate secret shares of selection result that represent the selected digital component. MPC1 and MPC2 can select the digital components in a sequence and maintain and update candidate parameters for each eligible digital component during the sequence of selection processes. In this way, many computations, such as user group membership checks, do not have to be repeated for each digital component slot. As these computations can include multiple operations per digital component and roundtrip computations between the MPC computers, computing the values once and reusing the values for multiple digital component slots can result in substantial computational and bandwidth savings.

In addition, this enables the MPC computers to apply inclusion and exclusion conditions that are based on other digital components that have been selected for presentation with the electronic resource. For example, MPC1 and MPC2 can update candidate parameters based on digital components that have been selected for other digital component slots of the electronic resource. This update can be performed after a digital component is selected for each individual digital component slot so that the updated parameters can be used for the selection process for the subsequent digital component slots.

For each digital component slot, MPC1 and MPC2 perform a secure MPC digital component selection process to generate a selection result that represents a selected digital component for the digital component slot (407). Each digital component selection process can include constituent operations 408-420.

For each eligible digital component, MPC1 and MPC2 determine whether the digital component is a candidate for being selected for distribution to the client device (408). The candidate digital components are the eligible digital components that satisfy all of the one or more conditions for the digital component, if the digital component is a conditional digital component. For example, a candidate digital component is a digital component for which the candidate expression is satisfied, e.g., that evaluates to a value of True or one. Each unconditional digital component that is eligible based on context is also a candidate digital component. MPC1 and MPC2 can determine the candidate digital components using a secure MPC process such that neither MPC1 nor MPC2 can identify the candidate digital components in cleartext.

The candidate expression for a digital component can include a set of candidate parameters and Boolean operators between each pair of candidate parameters. The candidate expression can be split into secret shares such that each MPC computer MPC1 and MPC2 has a secret share of the candidate expression and maintains a secret share of the value of each candidate parameter in the candidate expression. An example candidate expression can be in the form of Relationship 1 below:

$$Candidate_i = cp_1 OP_1 cp_2 OP_2 \ldots OP_N cp_N \quad (1)$$

In Relationship 1, if $Candidate_1$ evaluates to a value of True (or one), the digital component i is a candidate for selection in the current selection process. Each candidate parameter is represented by $cp_i$ and each Boolean operator is represented by $OP_i$. The candidate expressions for digital components are flexible and can have differing numbers of candidate parameters and Boolean operators. A secret share of the candidate expression is shown in Relationship 2 below:

$$[Candidate_i]_1 = [cp_1]_1 OP_1 [cp_2]_1 OP_2 \ldots OP_N [cp_N]_1 \quad (2)$$

Parameters appearing in brackets represent secret shares of the parameter within the brackets. The subscript outside the brackets indicate the number of the secret share. In this example, the number "1" indicates that these are secret shares held by MPC1.

For the first digital component slot in the sequence, MPC1 and MPC2 can compute the secret shares of each candidate parameter for each eligible digital component having a candidate expression. As an example, if a digital component has a condition that specifies that it is eligible for display to users in one or more user groups, the candidate expression for the digital component can include a user group parameter. If the user is a member of the user group, the user group parameter would have a value of True (or one). MPC1 and MPC2 can determine whether the user is a member of the user group based on the secret shares of the user group identifiers received in the digital component request and the user group(s) corresponding to the digital component, e.g., using a secure MPC process. This results in MPC1 storing a first secret share of the user group parameter and MPC2 storing a second secret share of the user group parameter. In this way, neither MPC computers can access the user group membership of the user in cleartext.

MPC1 and MPC2 can perform secure MPCs using the secret shares of the candidate parameters to evaluate the candidate expressions. At the end of these operations, MPC1 stores, for each candidate expression, a first secret share of whether the candidate expression is satisfied (e.g., whether $Candidate_i$ is True) and MPC2 stores, for each candidate expression, a second secret share of whether the candidate expression is satisfied.

In some implementations, the MPC computers MPC1 and MPC2 can generate garbled circuits or truth tables to represent the candidate expressions. This can reduce the computational requirements and bandwidth consumed to evaluate the candidate expressions. For example, MPC1 can act as the garbler and generate a garbled circuit using the candidate expression for each eligible digital component and send the garbled circuit to MPC2. MPC2 can act as the evaluator and evaluate the garbled circuit. The construction and evaluation of the garbled circuit results in each MPC computer having a secret share of the candidate parameter for each digital component.

MPC1 determines an order of the digital components based on the selection values (410). Similarly, MPC2 determines an order of the digital components based on the selection values (412). For a given digital component slot, these two orders should be exactly the same because the input to the ordering process is the same at MPC1 and MPC2. Each of MPC1 and MPC2 can determine an order of the digital components. Each order can include candidate digital components that were evaluated for candidate eligibility in operation 408 and other digital components. For example, the order can include all available digital components that are available for the digital component selection process or all eligible digital components for the digital component selection process (e.g., eligible based on contextual signals). The order can be from the digital component having the highest selection value to the digital component having the lowest selection value.

As the selection values are in cleartext, MPC1 and MPC2 do not have to perform any roundtrip computations to determine the order of the digital components. Instead. MPC1 and MPC2 can each order the selection values independently. If the selection values were stored as secret shares at MPC1 and MPC2, with each of MPC1 and MPC2 having a respective secret share of each selection value, MPC1 and MPC2 can perform a secure MPC process using roundtrip computations to order the selection values. If there is a tie between two or more selection values, MPC1 and MPC2 can break the tie deterministically using other metadata for the digital components corresponding to these selection values.

MPC1 and MPC2 determine secret shares of an accumulated value for each candidate digital component (414). Conceptually, the accumulated value for a given digital component represents a total number of candidate digital components from the top of the order to the selection value for the given digital component, excluding the given digital component even if the given digital component is a candidate. That is, the accumulated value represents a number of candidate digital components that are more eligible for selection than the given digital component. This concept is shown in Table 1 below.

TABLE 1

| Ordered Selection Values | $Candidate_i$ | Accumulated Value (acc) | Is Accumulated Value Equal to 0? |
|---|---|---|---|
| Highest | 0 | 0 | 1 |
| $2^{nd}$ Highest | 1 | 0 | 1 |
| $3^{rd}$ Highest | 0 | 1 | 0 |
| $4^{th}$ Highest | 1 | 1 | 0 |
| . . . | . . . | . . . | . . . |

In some implementations, the accumulated value for a given digital component represents a total number of candidate digital components from the top of the order to the given digital component, including the given digital component if the given digital component is a candidate. In this example, the fourth column would represent whether the accumulated value is equal to one rather than zero. For brevity, the remaining discussion will be in terms of the first example in which the accumulated value for a given digital component represents a total number of candidate digital components from the top of the order to the given digital component, excluding the given digital component even if the given digital component is a candidate.

Conceptually, in Table 1, the accumulated value (acc) is incremented for each digital component that has a candidate parameter $Candidate_i$ equal to one (or True) as it progresses from the top of the order to the bottom of the order. As described below, the calculation of the accumulated values acc is performed in secret shares. For example, the accumulated value acc for the digital component having the highest selection value is zero as the candidate parameter $Candidate_i$ for the highest selection value is equal to zero. The accumulated value acc for the second highest digital component is also zero as the candidate parameter Candidatei for the second highest digital component is equal to one but none of the selection values above the second highest digital component has a candidate parameter $Candidate_i$ equal to one. Moving down the order, accumulated value acc for the candidate parameter $Candidate_i$ for the third highest selection digital component is incremented to a value of one based on the candidate parameter $Candidate_i$ for the second highest selection value having a value of one (or True). As the candidate parameter Candidate for the third highest digital component is zero, the accumulated value acc for the fourth digital component is not incremented and has a value of zero like the third highest digital component.

For each digital component slot, using Table 1. MPC1 and MPC2 would select, for distribution to the client device 110, the digital component corresponding to the selection value for which the overall candidate parameter $Candidate_i$ has a value of one and the accumulated value acc has a value of zero, as indicated in the fourth column of Table 1. This represents the digital component corresponding to the highest ordered selection value for which the candidate parameter $Candidate_i$ has a value of one (or True). As the candidate parameter $Candidate_i$ is in secret shares for MPC1 and MPC2 to maintain user privacy and ensure that user data is not leaked, MPC1 and MPC2 determine secret shares of the accumulated value acc for each digital component and use roundtrip computations to determine which digital component has an accumulated value acc that is equal to zero (or False) and a candidate parameter $Candidate_i$ that is equal to one (or True).

MPC1 and MPC2 can determine their secret shares of the accumulated value acc for each digital component independently without any roundtrip computations in some implementations depending on the secret share algorithm. For example, MPC1 can determine, for each digital component i, a first share $[acc_{i,1}]$ of the accumulated value acc by traversing all of the digital components in order from highest to lowest and summing the candidate parameters $Candidate_i$ for the digital components along the way, as described above with reference to Table 1. Similarly, MPC2 can determine, for each digital component i, a second share $[acc_{i,2}]$ of the accumulated value acc by traversing all of the digital components in order from highest to lowest and summing the candidate parameters $Candidate_i$ for the digital components along the way.

MPC1 and MPC2 determine, for each digital component, secret shares of a result that indicates whether the accumulated value has a specified value (416). The specified value can be a value of zero, as shown in columns 3 and 4 of Table 1. As described above, the digital component for which the accumulated value is zero and the overall candidate parameter $Candidate_i$ is one is the digital component having the highest selection value among the candidate digital components.

MPC1 and MPC2 can engage in multiple rounds of computations as part of a secure MPC process to calculate the equality operation $acc_i$==0 in terms of secret shares for each digital component i. The equality operation is used to determine whether the accumulated value ace, for the digital component i has a value of zero. At the end of this process. MPC1 has, for each digital component i, one secret share of the result $acc_i$==0, and MPC2 has, for each digital component, the other secret share of the result $acc_i$==0.

MPC1 and MPC2 determine secret shares of a winner parameter $is\_dc\_the\_winner_i$ for each digital component i (418). For each digital component slot, MPC1 and MPC2 can determine the winner parameters $is\_dc\_the\_winner_i$ based on, for each digital component i, the secret shares of the accumulated value $acc_i$=0 and the secret shares of the candidate parameter $Candidate_i$ for each digital component i. The winner parameter $is\_dc\_the\_winner_i$ for each digital component i can be a Boolean value that indicates whether the digital component i is the winner of the selection process, e.g., whether the digital component i is selected for distribution to the client device 110 in response to the digital component request.

In some implementations MPC1 and MPC2 can carry out secret share multiplication protocol to calculate, for each selection value, the winner parameter $is\_dc\_the\_winner_i$== ($Candidate_i$×($acc_i$==0)) in terms of secret shares. This can include one RPC between MPC1 and MPC2 to multiple two secret shares. At the end of this MPC process, PCI has one secret share of the result $is\_dc\_the\_winner_i$ represented as [is dc the $winner_{i,1}$]=[$Candidate_{i,1}$]×([$acc_{i,1}$]==1). Similarly, MPC2 has the other secret share of the result $is\_dc\_the\_winner_i$ represented as [$is\_dc\_the\_winner_{i,2}$]=[$Candidate_{i,2}$]×([$acc_{i,2}$]=0). Note that for all digital components, at most one digital component has a winner parameter $is\_dc\_the\_winner_i$ that is equal to one, which is the digital component that is selected for distribution to the client device 110. All others would equal zero.

In some implementations, MPC1 and MPC2 can generate the secret shares of the winner parameters without using equality checks or multiplications over secret shares, which can improve the performance of the selection process, e.g., by reducing the computational complexity of the operations. Rather than computing the accumulated values, MPC1 and MPC2 can then determine secret shares of a rank value $rank_i$ for each candidate digital component. The rank value for a given digital component indicates whether there are any candidate digital components that have a higher selection value than the given digital component. The rank value for a digital component can be True or False. The digital component is the selected digital component if the rank value is False and the digital component is a candidate.

MPC1 and MPC2 determine a selection result (420). In some implementations, MPC1 and MPC2 can calculate the selection result based on the winner parameters for the digital components and the digital component information element (dc_information_element) for the digital components. As described above, the digital component information element dc_information_element for a digital component can include the digital component itself (or a reference to the digital component) and optionally other data for the digital component.

Conceptually, MPC1 and MPC2 can calculate the selection result parameter "result" using Relationship 3 below:

$$\text{result}=\Sigma_i \text{is\_dc\_the\_winner}_i \times \text{dc\_information\_element}_i \quad (3)$$

That is, MPC1 and MPC2 can determine, across all of the digital components, the sum of the products of the winner parameter $\text{is\_dc\_the\_winner}_i$ and the digital component information element $\text{dc\_information\_element}_i$. In this example, the selection result will either have a value zero if there are no candidate digital components or will have a value equal to the digital component information element dc_information_element of the selected digital component that has a winner parameter $\text{is\_dc\_the\_winner}_i$ that is equal to one.

To perform the calculation in secret shares. MPC1 takes all of the digital components and multiplies the digital component information element $\text{dc\_information\_element}_i$ for the digital component, which can be in cleartext, by the first secret share of the winner parameter $[\text{is\_dc\_the\_winner}_{i,1}]$ for the digital component. The MPC1 can then determine the sum of these products and return the sum to the client device 110 that submitted the digital component request. That is, MPC1 can determine, as a first secret share $[\text{result}_1]$ of the result, the sum using Relationship 4 below:

$$[\text{result}_1]=\Sigma_i([\text{is\_dc\_the\_winner}_i]\times \text{dc\_information\_element}_i) \quad (4)$$

MPC2 can perform a similar calculation to determine the second secret share $[\text{result}_2]$ of the result using Relationship 5 below:

$$[\text{result}_2]=\Sigma([\text{is\_dc\_the\_winner}_i]\times \text{dc\_information\_element}_i) \quad (5)$$

In some implementations, the performance of the MPC cluster 130 can be improved by replacing multiplications performed in secret shares with bitwise AND operations and replacing summations with bitwise XOR operations.

MPC1 and MPC2 update the candidate parameters based on the selected digital component prior to repeating operation 407 for any additional digital component slots for which a digital component is to be selected. For example, if a first digital component is selected and a second digital component has an exclusion condition that excludes the second digital component from being presented concurrently with the first digital component, MPC1 and MPC2 can update their secret shares of the exclusion parameter for the first digital component based on the first digital component being selected.

For example, consider an exclusion condition for a first digital component. The exclusion condition indicates that the first digital component is not to be displayed concurrently with a second digital component. In this example, the first digital component cannot be selected for a digital component slot if the second digital component was selected for a previous digital component slot. The corresponding Boolean expression would be (NOT is_dc_the_winner_i) AND . . . (NOT is_dc_the_winner_j) where "is_dc_the_winner" represents the winner parameter for the second digital component and i and j represent previous digital component slots for which a digital component has been selected for the current digital component request. This Boolean expression can be part of a larger candidate expression for the first digital component, e.g., that includes user group membership conditions, pacing conditions, and/or other conditions. A similar expression can be used when the first digital component cannot be shown multiple times concurrently with the same resource. In this example, the parameter "is_dc_the_winner" would represent the winner parameter for the first digital component.

In another example, consider an inclusion condition for a first digital component. The exclusion condition indicates that the first digital component is eligible to be displayed concurrently with a second digital component. In this example, the first digital component can be selected for a digital component slot if the second digital component was selected for a previous digital component slot. The corresponding Boolean expression would be (is_dc_the_winner_i) OR . . . (is_dc_the_winner_j) where "is_dc_the_winner" represents the winner parameter for the second digital component and i and j represent previous digital component slots for which a digital component has been selected for the current digital component request. This Boolean expression can be part of a larger candidate expression for the first digital component, e.g., that includes user group membership conditions, pacing conditions, and/or other conditions.

MPC1 and MPC2 can then repeat the selection process of operation 407 using the candidate expressions and their updated candidate parameters.

After the final selection process is performed for the final digital component slot of the electronic resource, MPC1 and MPC2 provide the selection results to the client device 110 (424). As described above, one of the MPC computers can provide a composite result that includes the secret shares of each selection result. For example, MPC2 can encrypt its secret share of each selection result and provide the encrypted secret shares to MPC1. MPC1 can generate the composite result that includes its secret share of each selection result and each encrypted selected result received from MPC2. MPC1 can then provide the composite result to the client device 110.

Figure 5:
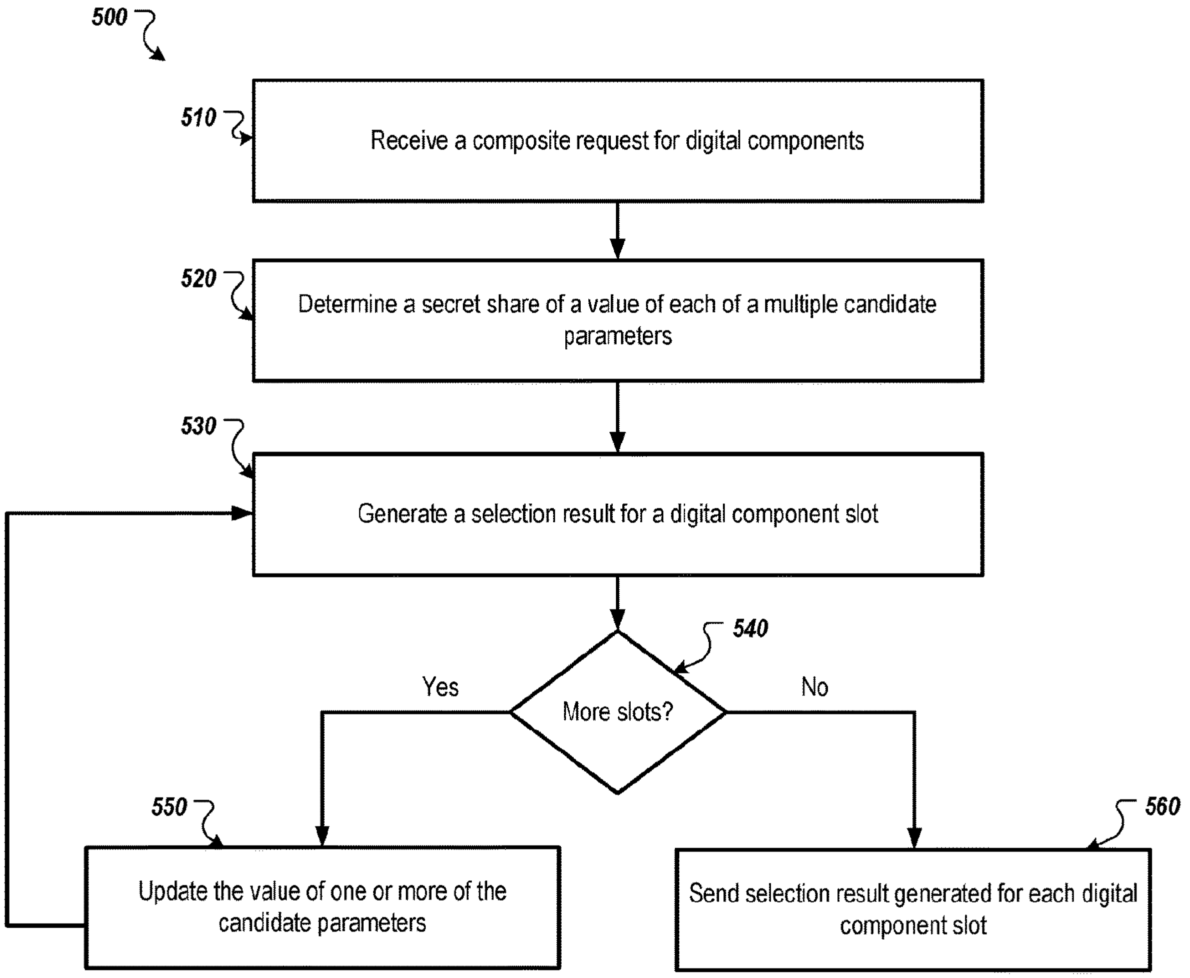
FIG. 5 is a flow diagram of an example process for selecting and distributing multiple digital components to a client device.

FIG. 5 is a flow diagram of an example process 500 for determining digital components for all digital component slots in a digital component selection process. Operations of the process 500 can be implemented, for example, by the computing systems MPC1 and MPC2 of the MPC cluster 130. Operations of the process 500 can also be implemented as instructions stored on one or more computer readable media which may be non-transitory, and execution of the instructions by one or more data processing apparatus can cause the one or more data processing apparatus to perform the operations of the process 500.

A first MPC computer (which is referred to as MPC1 for brevity) receives a composite request (510). For example, an application 112 of a client device 110 can send a composite request for digital components to MPC1 of the MPC cluster 130. The composite request can be a request for multiple digital components to present in multiple digital component slots of an electronic resource. The composite request includes information used in a digital component selection process. For example, as described above, the composite request can include contextual data and secret shares of user group identifiers for user groups that include the user as a member.

MPC1 determines a secret share of a value of each candidate parameter (520). As described above, a digital component can have a candidate expression that includes multiple candidate parameters and Boolean operators between each pair of candidate parameters. MPC1 can identify a set of eligible digital components based on contextual data included in the composite request. MPC1 can also collaborate with MPC2 using a secure MPC process to determine secret shares of the values of each candidate parameter of each candidate expression for each eligible digital component in the set.

MPC1 determines a secret share of a selection result for component digital component slot (530). As described above, the MPC cluster 130 can select a digital component and generate a selection result for each digital component slot in a sequence. For each digital component slot. MPC1 can collaborate with MPC2 using a secure MPC process to identify candidate digital components and generate secret shares of a selection result that identifies a selected digital component for the digital component slot, as described with reference to FIG. 4.

MPC1 determines whether there are any additional digital component slots for which a digital component is to be selected (540). If so, MPC1 updates its secret shares of one or more candidate parameters (550). For example, MPC1 can collaborate with MPC2 using secure MPCs to update the secret shares of the values of the candidate parameter(s) based on the selected digital component. MPC1 can then collaborate with MPC2 to select a digital component for a next digital component using the updated secret shares of the values of the candidate parameters.

If not, MPC1 sends the selection results to the client device 110 from which the composite digital component request was received (560). As described above, MPC1 can send a composite result that includes the secret shares of the selection result for each digital component slot.

Figure 6:
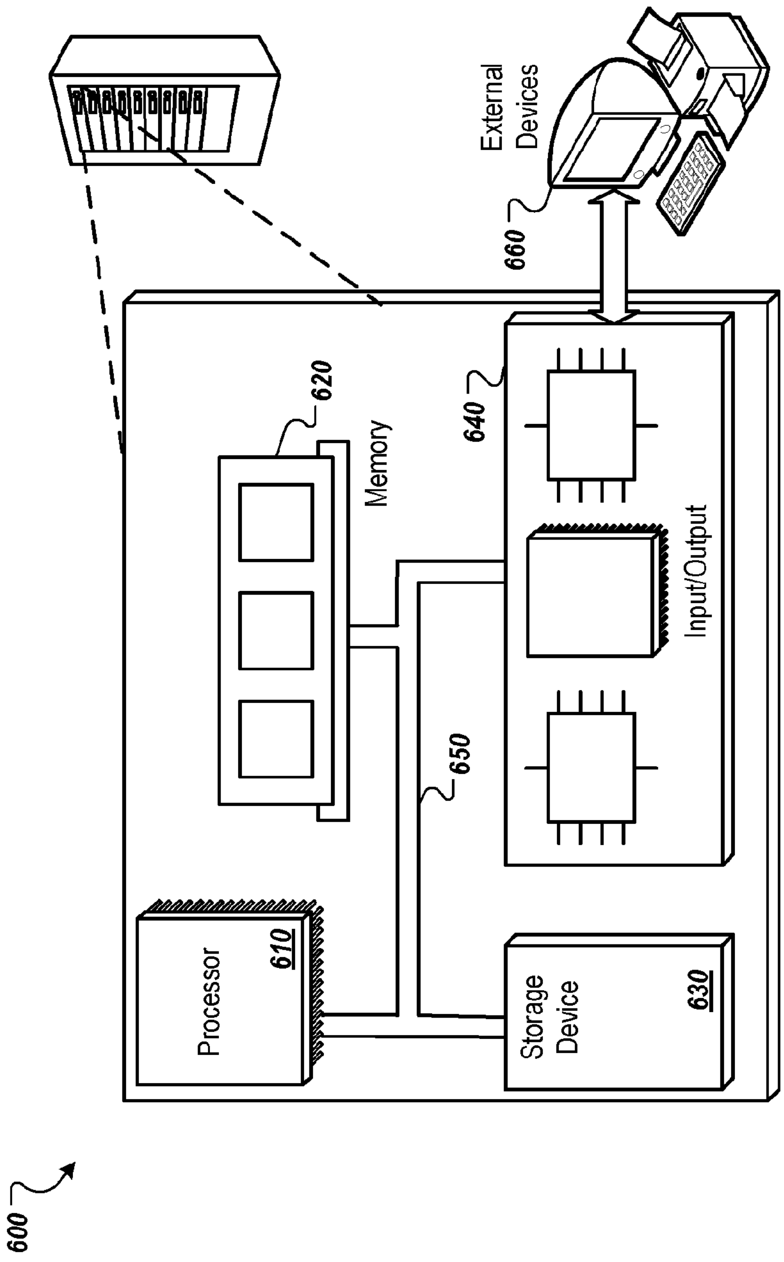
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 20 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term “data processing apparatus” encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks: magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:

receiving, from a client device and by a first multi-party computation (MPC) computer of a group of MPC computers that collaborate to perform MPC computations, a composite request for digital components to display in multiple digital component slots of an electronic resource, the composite request comprising first secret shares of data identifying user groups that include a user of the client device as a member;

determining, in collaboration with one or more second MPC computers of the group of MPC computers, a first secret share of a value of each of a plurality of candidate parameters of a candidate expression for each digital component in a set of digital components;

for each digital component slot, generating a selection result comprising a first secret share of digital component data identifying a selected digital component that is selected for display in the digital component slot, the generating comprising, for each digital component in the set of digital components, determining, in collaboration with the one or more second MPC computers, a first secret share of a candidate result for each digital component based on the candidate expression for the digital component and the value of each of the plurality of candidate parameters, and generating, based on the first secret share of the candidate result for each digital component and a corresponding second secret share of the candidate result held by each of the one or more second MPC computers, the selection result, and for at least a portion of the digital component slots, updating, for at least a portion of the digital components, the value of one or more of the candidate parameters for the digital component based on the selected digital component; and sending, to the client device, composite result data comprising the selection result generated for each digital component slot.

2. The computer-implemented method of claim 1, further comprising obtaining a first secret share of the candidate expression for a given digital component, wherein the candidate expression for the given digital component includes a plurality of candidate parameters for determining whether the digital component is a candidate for distribution in response to digital component requests.

3. The computer-implemented method of claim 1, further comprising generating a garbled circuit for at least a subset of the set of digital components based on the candidate expression for each digital component in the subset.

4. The computer-implemented method of claim 1, wherein generating the selection result for each digital component slot comprises generating each selection result in a sequence from a first digital component slot to a last digital component slot of the multiple digital component slots.

5. The computer-implemented method of claim 4, wherein updating, for at least a portion of the digital components, the value of one or more of the candidate parameters for the digital component comprises updating the value of the one or more candidate parameters for the digital component based on the selection result of at least one previous digital component slot prior to generating the selection result for a subsequent digital component slot in the sequence.

6. The computer-implemented method of claim 1, wherein adjusting, for at least a portion of the digital components, the value of one or more of the candidate parameters for the digital component comprises updating secret shares of a pacing parameter for the selected digital component.

7. The computer-implemented method of claim 1, wherein updating, for at least a portion of the digital components, the value of one or more of the candidate parameters for the digital component comprises updating, for a given digital component, secret shares of a value of an exclusion parameter that excludes the given digital component from being presented with the selected digital component.

8. The computer-implemented method of claim 1, wherein updating, for at least a portion of the digital components, the value of one or more of the candidate parameters for the digital component comprises updating, for a given digital component, secret shares of a value of an inclusion parameter that specifies that the given digital component is eligible to be presented with the selected digital component.

9. The computer-implemented method of claim 1, further comprising storing secret shares of user group membership parameters for a subset of the set of digital components after generating the selection result for a first digital component slot, wherein the user group membership parameter for a digital component indicates whether a user of the client device is a member of a user group corresponding to the digital component.

10. The computer-implemented method of claim 9, further comprising using the stored secret shares of the user group membership parameters for the subset of digital components for selecting a digital component for one or more subsequent digital component slots following the first digital component slot.

11. The computer-implemented method of claim 1, wherein generating the selection result comprises generating a first secret share of a candidate digital component having a highest selection value among candidate digital components, wherein a candidate digital component is a digital component having a candidate result indicating that the digital component is a candidate for selection.

12. The computer-implemented method of claim 1, wherein the composite request comprises a set of contextual signals, the method further comprising selecting the set of digital components based on the set of contextual signals.

13. A system comprising:

one or more processors; and one or more storage devices storing instructions that, when executed by the one or more processors, cause the one or more processors to perform operations comprising:

receiving, from a client device and by a first multi-party computation (MPC) computer of a group of MPC computers that collaborate to perform MPC computations, a composite request for digital components to display in multiple digital component slots of an electronic resource, the composite request comprising first secret shares of data identifying user groups that include a user of the client device as a member;

determining, in collaboration with one or more second MPC computers of the group of MPC computers, a first secret share of a value of each of a plurality of candidate parameters of a candidate expression for each digital component in a set of digital components;

for each digital component slot, generating a selection result comprising a first secret share of digital component data identifying a selected digital component that is selected for display in the digital component slot, the generating comprising, for each digital component in the set of digital components, determining, in collaboration with the one or more second MPC computers, a first secret share of a candidate result for each digital component based on the candidate expression for the digital component and the value of each of the plurality of candidate parameters, and generating, based on the first secret share of the candidate result for each digital component and a corresponding second secret share of the candidate result held by each of the one or more second MPC computers, the selection result, and for at least a portion of the digital component slots, updating, for at least a portion of the digital components, the value of one or more of the candidate parameters for the digital component based on the selected digital component; and sending, to the client device, composite result data comprising the selection result generated for each digital component slot.

14. The system of claim 13, wherein the operations comprise obtaining a first secret share of the candidate expression for a given digital component, wherein the candidate expression for the given digital component includes a plurality of candidate parameters for determining whether the digital component is a candidate for distribution in response to digital component requests.

15. The system of claim 13, wherein the operations comprise generating a garbled circuit for at least a subset of the set of digital components based on the candidate expression for each digital component in the subset.

16. The system of claim 13, wherein generating the selection result for each digital component slot comprises generating each selection result in a sequence from a first digital component slot to a last digital component slot of the multiple digital component slots.

17. The system of claim 16, wherein updating, for at least a portion of the digital components, the value of one or more of the candidate parameters for the digital component comprises updating the value of the one or more candidate parameters for the digital component based on the selection result of at least one previous digital component slot prior to generating the selection result for a subsequent digital component slot in the sequence.

18. The system of claim 13, wherein adjusting, for at least a portion of the digital components, the value of one or more of the candidate parameters for the digital component comprises updating secret shares of a pacing parameter for the selected digital component.

19. The system of claim 13, wherein updating, for at least a portion of the digital components, the value of one or more of the candidate parameters for the digital component comprises updating, for a given digital component, secret shares of a value of an exclusion parameter that excludes the given digital component from being presented with the selected digital component.

20. A non-transitory computer readable storage medium carrying instructions that, when executed by one or more processors, cause the one or more processors to perform operations comprising:

receiving, from a client device and by a first multi-party computation (MPC) computer of a group of MPC computers that collaborate to perform MPC computations, a composite request for digital components to display in multiple digital component slots of an electronic resource, the composite request comprising first secret shares of data identifying user groups that include a user of the client device as a member;

determining, in collaboration with one or more second MPC computers of the group of MPC computers, a first secret share of a value of each of a plurality of candidate parameters of a candidate expression for each digital component in a set of digital components;

for each digital component slot, generating a selection result comprising a first secret share of digital component data identifying a selected digital component that is selected for display in the digital component slot, the generating comprising, for each digital component in the set of digital components, determining, in collaboration with the one or more second MPC computers, a first secret share of a candidate result for each digital component based on the candidate expression for the digital component and the value of each of the plurality of candidate parameters, and generating, based on the first secret share of the candidate result for each digital component and a corresponding second secret share of the candidate result held by each of the one or more second MPC computers, the selection result, and for at least a portion of the digital component slots, updating, for at least a portion of the digital components, the value of one or more of the candidate parameters for the digital component based on the selected digital component; and sending, to the client device, composite result data comprising the selection result generated for each digital component slot.

* * * * *